United States Patent [19]

Chapman et al.

[11] Patent Number: 5,320,033
[45] Date of Patent: Jun. 14, 1994

[54] APPARATUS FOR TOP AND TAILING VEGETABLES

[76] Inventors: Donald J. Chapman, 21413 Leslie Street, R.R. #1; Gregory K. Witty, R.R. #1, both of Queensville, Ontario, Canada, L0G 1R0

[21] Appl. No.: 97,032

[22] Filed: Jul. 27, 1993

[30] Foreign Application Priority Data

Feb. 1, 1993 [CA] Canada .................................. 2088571

[51] Int. Cl.$^5$ .............................................. A23N 15/00
[52] U.S. Cl. ........................................ 99/636; 99/637; 99/643
[58] Field of Search .................................. 99/635–637, 99/638, 642, 643, 546; 198/957, 844.1, 848, 850–852; 426/482, 518

[56] References Cited

U.S. PATENT DOCUMENTS

| | | | |
|---|---|---|---|
| 1,098,398 | 6/1914 | Phinney | 99/636 |
| 1,155,455 | 10/1915 | Wegner | 99/636 |
| 1,257,164 | 2/1918 | Wegner | 99/636 |
| 1,777,384 | 10/1930 | Smith | 99/636 |
| 2,192,838 | 3/1940 | McGrew | 99/636 |
| 3,669,240 | 6/1972 | Ross | 99/643 |
| 3,670,792 | 6/1972 | Claussen | 99/643 |
| 4,055,265 | 10/1977 | Eisenman | 198/844.1 |
| 4,367,675 | 1/1983 | Boots . | |
| 4,741,431 | 5/1988 | Whitehead | 198/844.1 |
| 4,831,925 | 5/1989 | Zanetti . | |
| 4,900,609 | 2/1990 | Arnold | 198/957 |
| 5,169,663 | 12/1992 | Rossi et al. | 99/635 |

FOREIGN PATENT DOCUMENTS 1043730 9/1966 United Kingdom .

OTHER PUBLICATIONS

Advertising pamphlet from Goodale Manufacturing Company, date unknown.

*Primary Examiner*—Timothy F. Simone
*Attorney, Agent, or Firm*—Jane Parsons

[57] ABSTRACT

Apparatus for top and tailing vegetables, for example carrots, comprises an endless flexible plastics material belt formed of inter-linked transverse links between which a drive wheel may rest. The belt is divided into compartments by interspaced modified links having upstanding molded walls over most of the width of the belt. The belt tilts from side to side on a wide support surface to tilt vegetables first one way and then the other. Knives operate in margins of the belt free of upstanding walls on vegetables which have been tilted towards them. Sidewalls for the belt which stop vegetables falling off it are absent in the region of the knives to allow detritus to fall easily away.

18 Claims, 16 Drawing Sheets

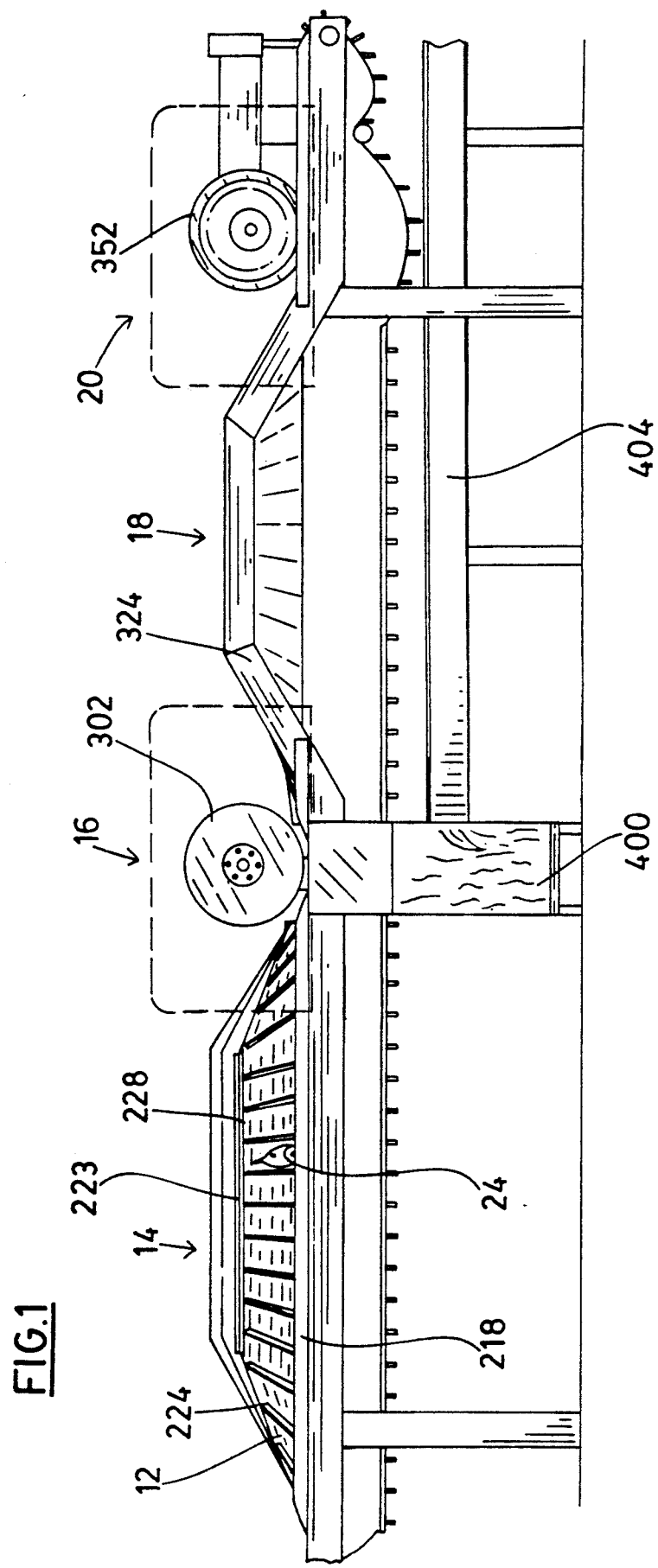

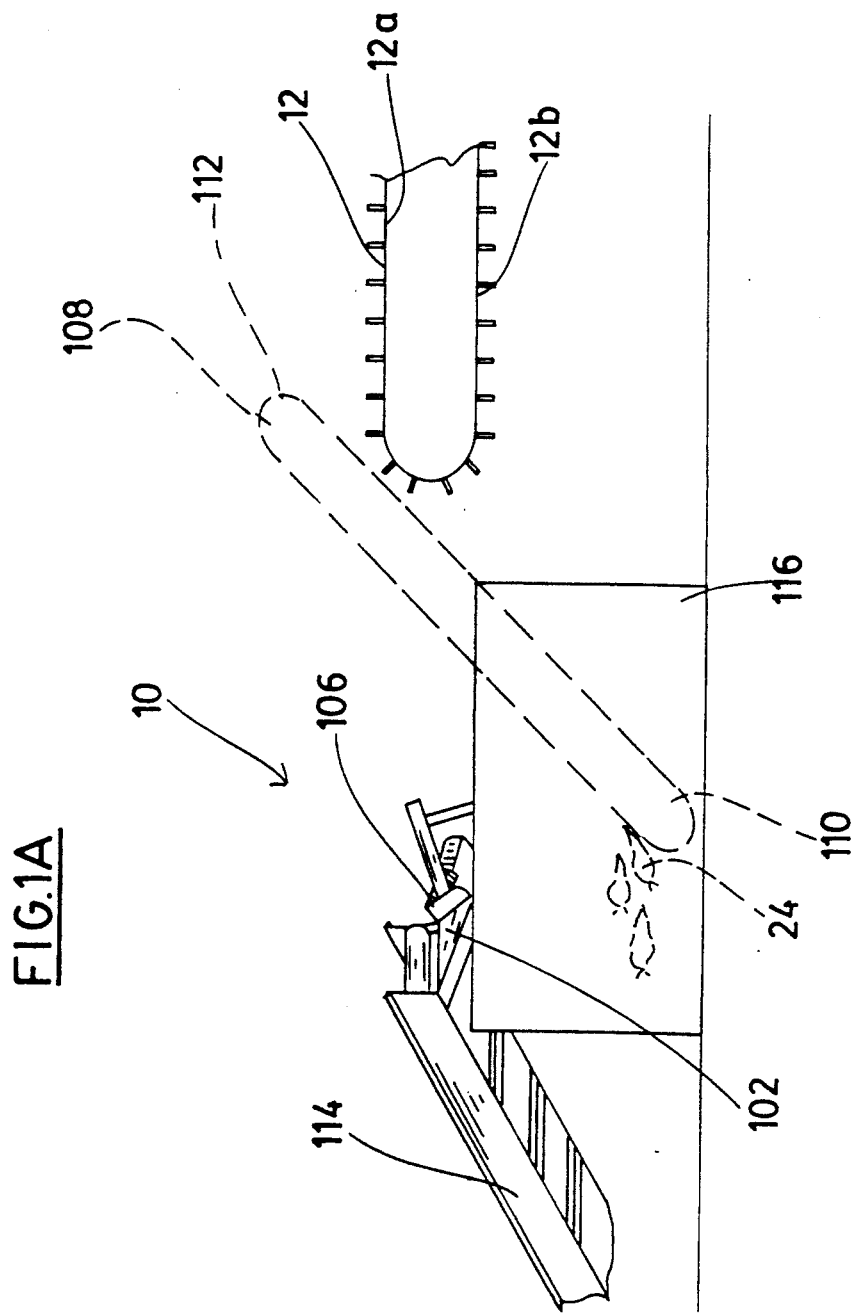

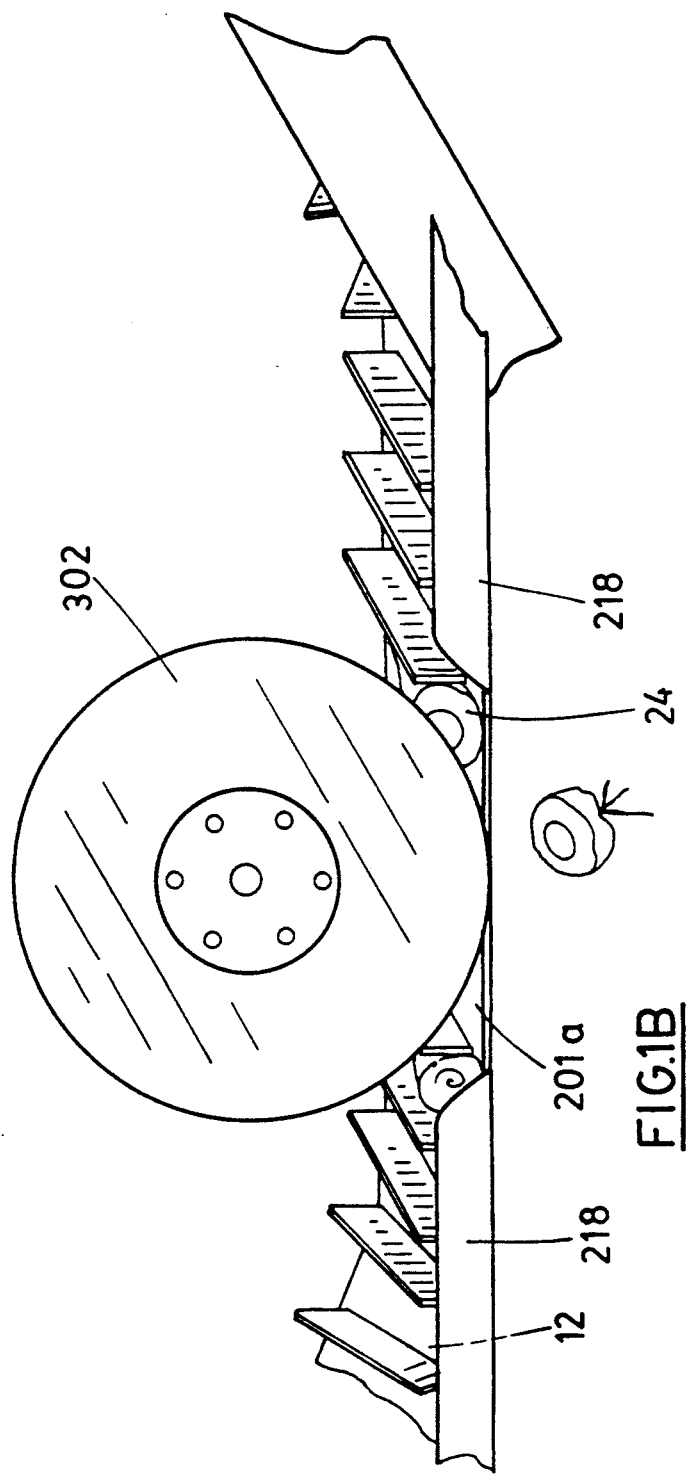

APPARATUS FOR TOP AND TAILING VEGETABLES

BACKGROUND OF THE INVENTION

1. Field of the Invention

The present invention relates to a machine for topping and tailing vegetables, especially root vegetables and more especially carrots.

2. Acknowledgement of Prior Art

Modern farming techniques and bulk food processing, as, for example, in the canned vegetable and soup industry have resulted in the demand for bulk quantities of prepared vegetables ready for immediate use. Farming machinery has been developed for the actual harvesting, by which is meant the removal of the vegetables from the field, but a significant problem has been encountered in the preparation of the freshly harvested vegetables for bilk delivery to the food processing industry.

For example, carrots and some other root vegetables are required by the food processing industry to be delivered free of substantial blemishes. Such blemishes may include a fibrous discoloured crowns and stringy, elongate tails. Thus, the food processing industry requires the delivery of such vegetables as carrots in a topped and tailed and washed condition. These requirements may also apply to other elongate vegetables such as beans which also require removal of less edible end parts.

Generally the preparation of harvested vegetables for the food market has been a very labour intensive procedure resulting in increased cost in the end product such as canned soups, canned vegetables, sauces and the like.

Some attempts have been made to automate the preparation of harvested vegetables for use by the bulk food processing industry. For example, U.S. Pat. No. 1,098,398 was issued Jun. 2, 1914 to Phinney. That patent discloses a machine for trimming the ends of string beans. Phinney discloses a carrying belt for beans which may lay in troughs or pockets transverse to the length of the belt. The belt is tilted in one direction to slide the beans so that their ends project transversely of the belt and may be cut off. The belt may be then tilted in the other direction so that the beans slide in the other direction to project transversely off the belt so that they, also, may be cut off.

Phinney's principle of tilting apparatus in one direction to slide vegetables toward a first knife to have first ends cut off and then tilting apparatus in another direction to slide the vegetables towards a second knife to have the other ends cut off, has been utilised in later more sophisticated apparatus. For example, Zanetti in U.S. Pat. No. 4,831,925 issued May 23, 1989 discloses a conveyor belt for trimming vegetables such as cucumbers, zucchini, carrots, eggplants. The conveyor belt comprises a plurality of individual containers. Another apparatus of this type is marketed by the Goodale Manufacturing Co. of Watsonville, California.

Various problems have been encountered in the provision of machinery which tilts the vegetables in first one direction and then in the other direction. Generally such machinery has involved the use of a conveyor belt which comprises individual compartments for the vegetables, the compartments running from one side of the belt to the other and being linked by means of flexible bands or chains. The conveyor belt may run on side rails one of which and then the other of which is alternately raised and lowered to provide a tilting of the belt. Because the belt comprises individual trays carried by connecting drive chains, it may be excessively flexible. Its support between the rails on which it runs may cause problems especially when very heavy vegetables, such as carrots, are to processed. There may be tendency for the belt to sag. Such sagging or stretching of the belt may cause problems in the setting of the position of a rotary knife for trimming the vegetables. It is necessary stop means to prevent the vegetables from sliding right out of the troughs of the belt but it is necessary that such stop means do not impede the action of a rotary knife. If the troughs sag or move out of position a rotary knife may either fail to cut right through the vegetable or foul on the floor of the trough or on its stop means at its end. still further, conveyor belts comprising individual metal troughs possibly made of stainless steel connected by some type of flexible band or by a chain maybe to difficult to move. It is convenient that such belts be endless belts and be rotated by suitable drive means. For many endless conveyor belts, the suitable drive means may be a sprocket wheel located at adjacent ends of a conveyor run and return run. For complex belts comprising a number of individual troughs connected by endless bands or chains, the drive means may be more complex. The present inventor has addressed the numerous interactive features which make the provision of a suitable machine for top and tailing carrots difficult to provide.

SUMMARY OF THE INVENTION

According to the prevention there is provided apparatus for continuous operation to trim the ends of elongate vegetables. The apparatus comprises an endless conveyor belt formed of a plurality of interconnected ridged links. The links are interconnected by a transverse hinge pin and is arranged in a carrier run and a return run direction of the belt to provide flexibility. The conveyor belt is arranged in a carrier run and a return run. A support surface for the carrier run of the conveyor belt extends between first and second side edges to support the belt. The endless conveyor belt is divided into a plurality of transverse compartments by upstanding transverse walls provided at equal spaced apart intervals, each upstanding transverse wall formed integrally with a respective link and extending fully across the mid-portion of said respective link. The support surface includes a first tilt ramp rising gradually from a first point where the first and second side edges are level to raise the first side edge with respect to the second side edge and descending gradually to lower said first side edge with respect to said second side edge to become level with it once more. Thus a first portion of the carrier run of the conveyor belt is tilted sideways in one direction. The second tilt ramp rises gradually from a second point where the first and second side edges are level to raise said second side edge with respect to said first side edge and descend gradually to lower said second side edge to become level with it once more. Thus a second portion of the carrier run of the conveyor belt is tilted sideways in an opposed direction to said one direction. First and second stop means are provided upstanding from and spaced from lower respective side edges in the region of the first and second tilt ramps defining first and second gaps between the respective ramps and stop means. Thus vegetables lying transversely across the conveyor belt may slide in one direction on the first tilt ramp and in the other direction on the other tilt ramp to overlie the respective gaps. First and second knives are located in the first and second ramps to cut through vegetables overlying the gaps. Means are provided to advance the conveyor belt on its carrier run and to return it on its return run.

BRIEF DESCRIPTION OF THE DRAWINGS

An embodiment of the invention will now be described by way of example with reference to the drawings, in which:

FIG. 1 is a plan view of one embodiment of a carrot cutter according to the invention;

FIG. 1A shows the carrot feed upstream of the upstream end of FIG. 1;

FIG. 1B shows a detail of FIG. 1 in the region of the first cutting station;

DETAILED DESCRIPTION OF PREFERRED EMBODIMENTS

Figure 2:
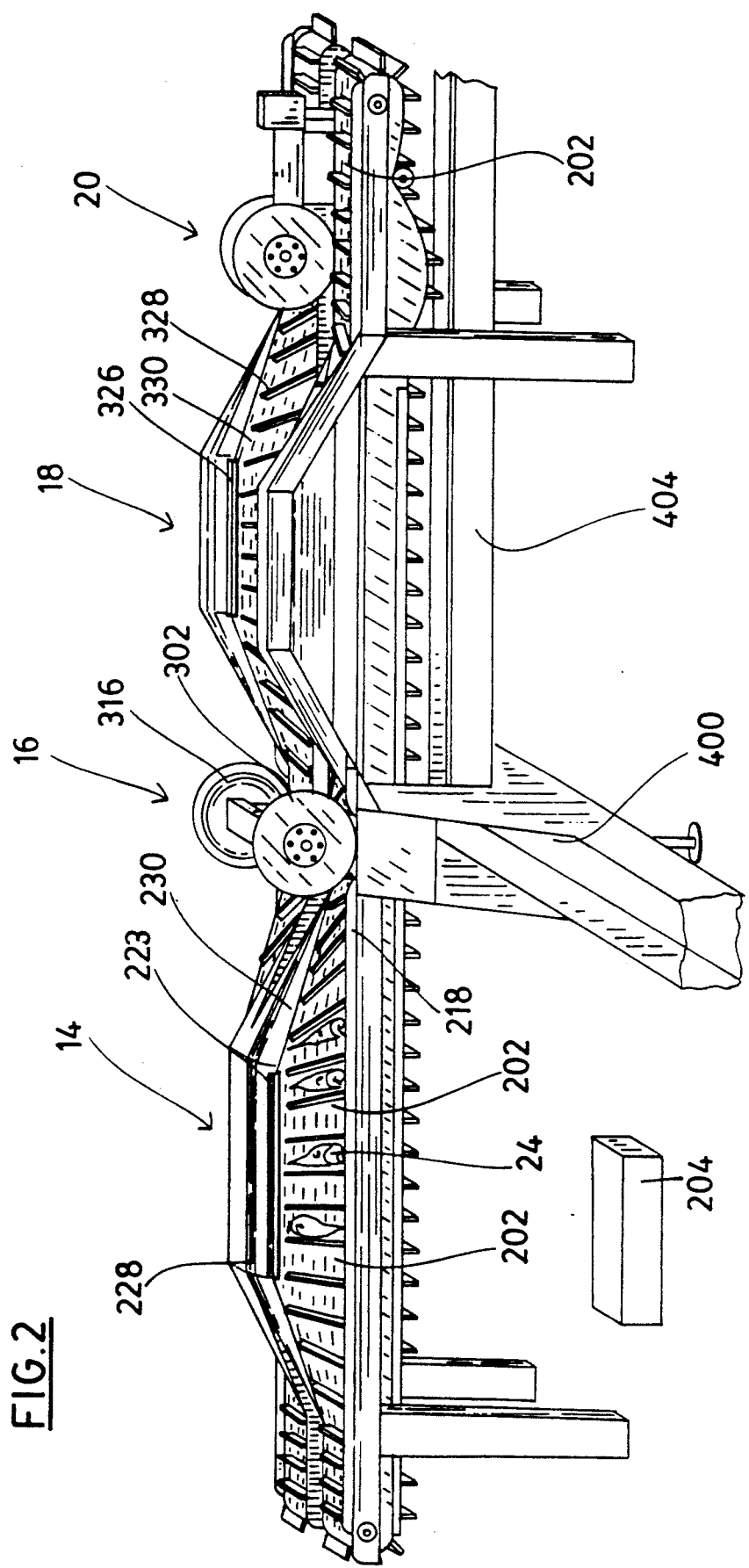
FIG. 2 is a perspective view of the carrot cutter of FIG. 1 as seen from slightly above, to show conveyor tracks in tandem.

Apparatus for top and tailing vegetables ready for large-scale supply to the food processing industry may comprise a carrot cutter as shown in the FIGS. The carrot cutter may include a carrot delivery station 10, at least one compartmentalized conveyor belt 12 to transport the carrots through a first tilted ramp station 14 to a first cutting station 16 and through a second tilted ramp region 18 to a second cutting station 20 and to a discharge region 22. The carrot cutter illustrated in the drawings comprises two conveyor belts 12 operating in tandem; and the delivery station 10 includes means to divide the flow of carrots 22 into two streams, one for each belt. It is, however, to be emphasized that apparatus comprising only one conveyor belt 12 or apparatus comprising more than two conveyor belts is within the scope of the invention.

Figure 6:
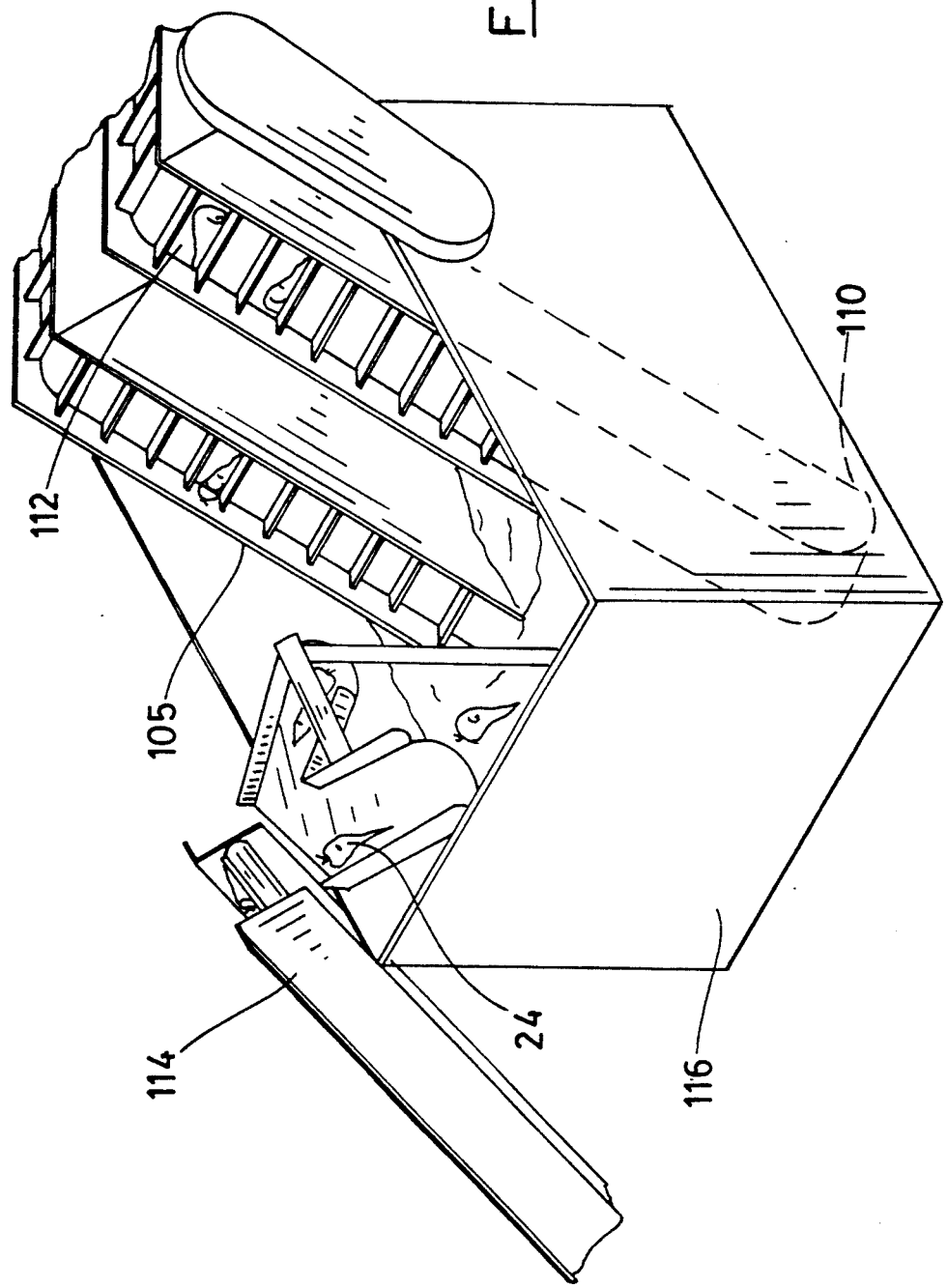
FIG. 6 is a view of the carrot feed mechanism and a divider to direct carrots to respective conveyors of the carrot cutter of FIGS. 1 and 2.
Figure 7:
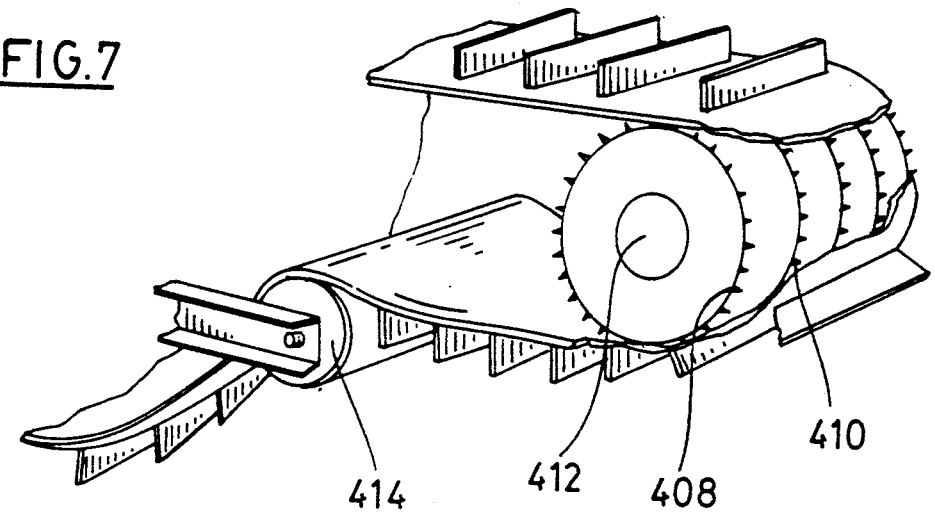
FIG. 7 is a view of the discharge end of the carrot cutter of FIGS. 1 and 2, showing drive means for the conveyors.
Figure 8:
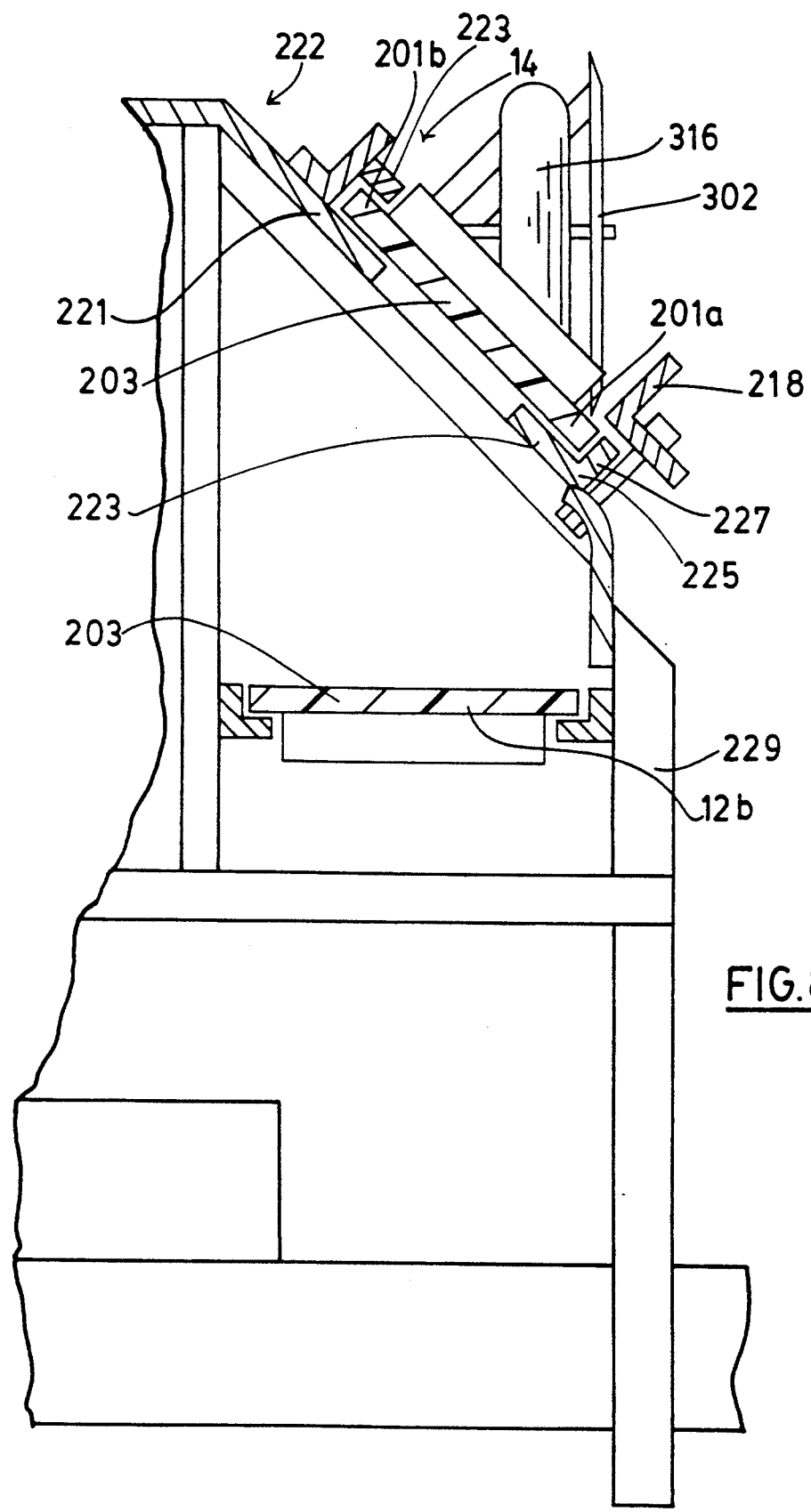
FIG. 8 is a section on the line VIII—VIII of FIG. 1.
Figure 9:
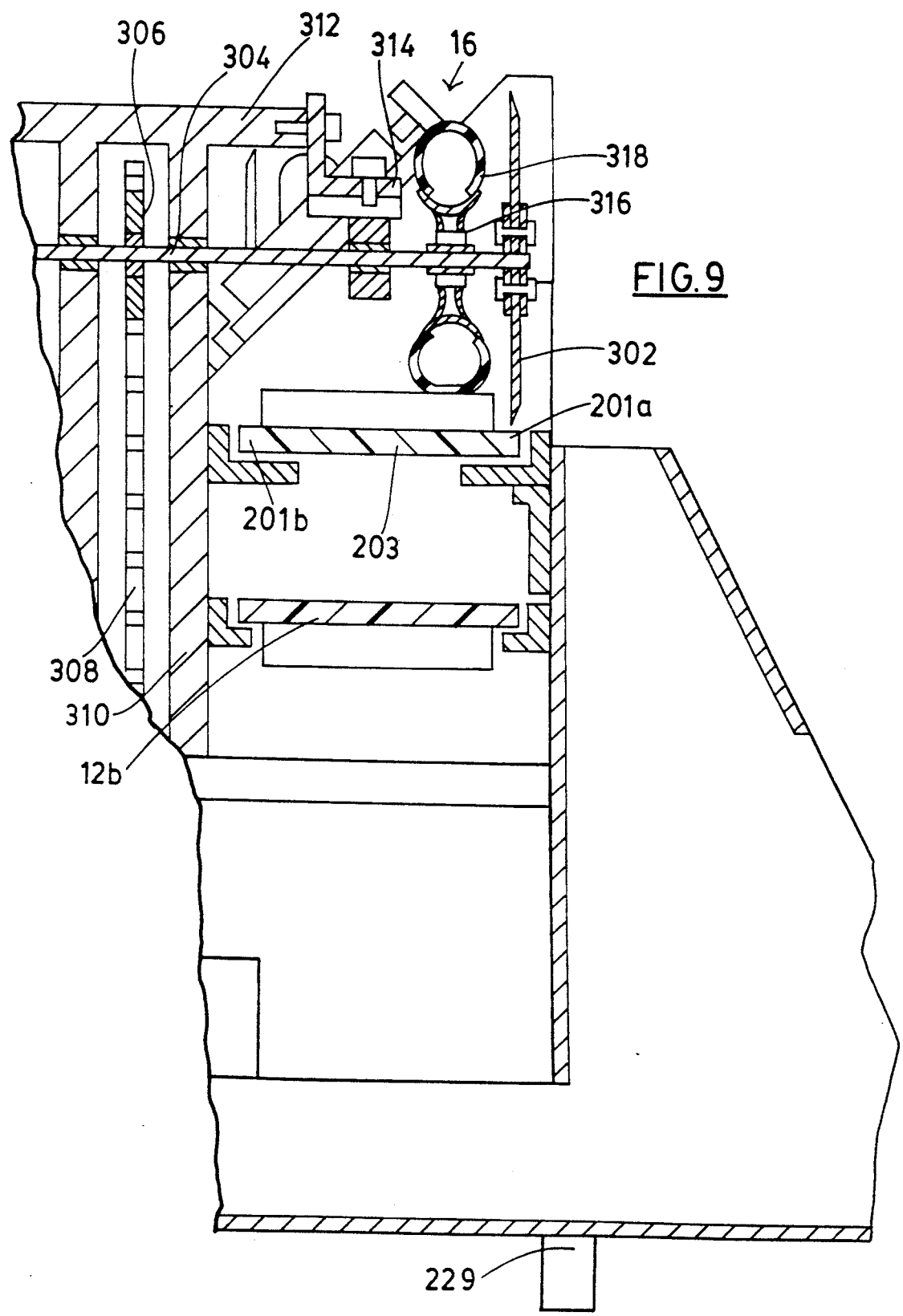
FIG. 9 is a section on the line IX—IX of FIG. 1.
Figure 10:
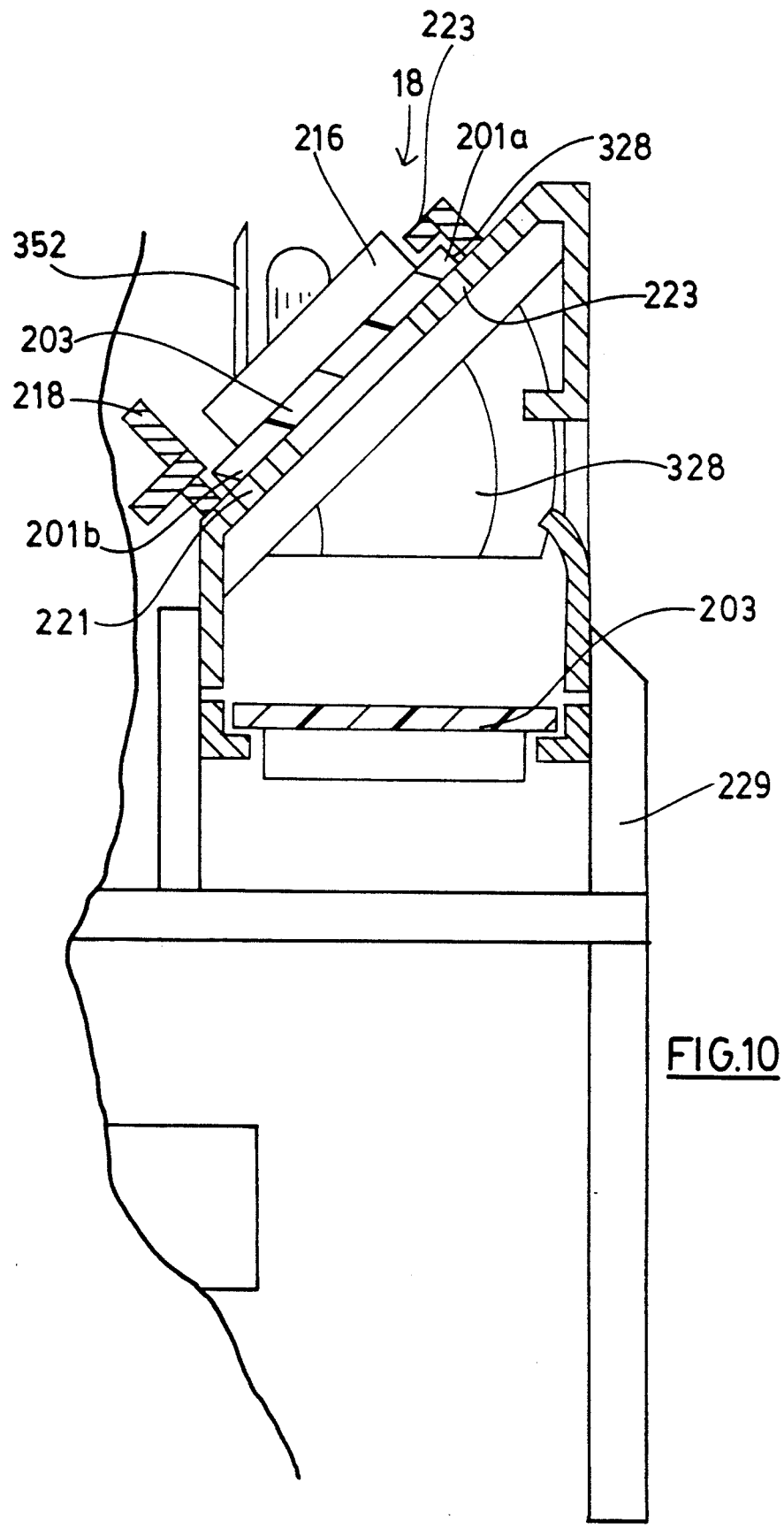
FIG. 10 is a section on the line X—X of FIG. 1.
Figure 11:
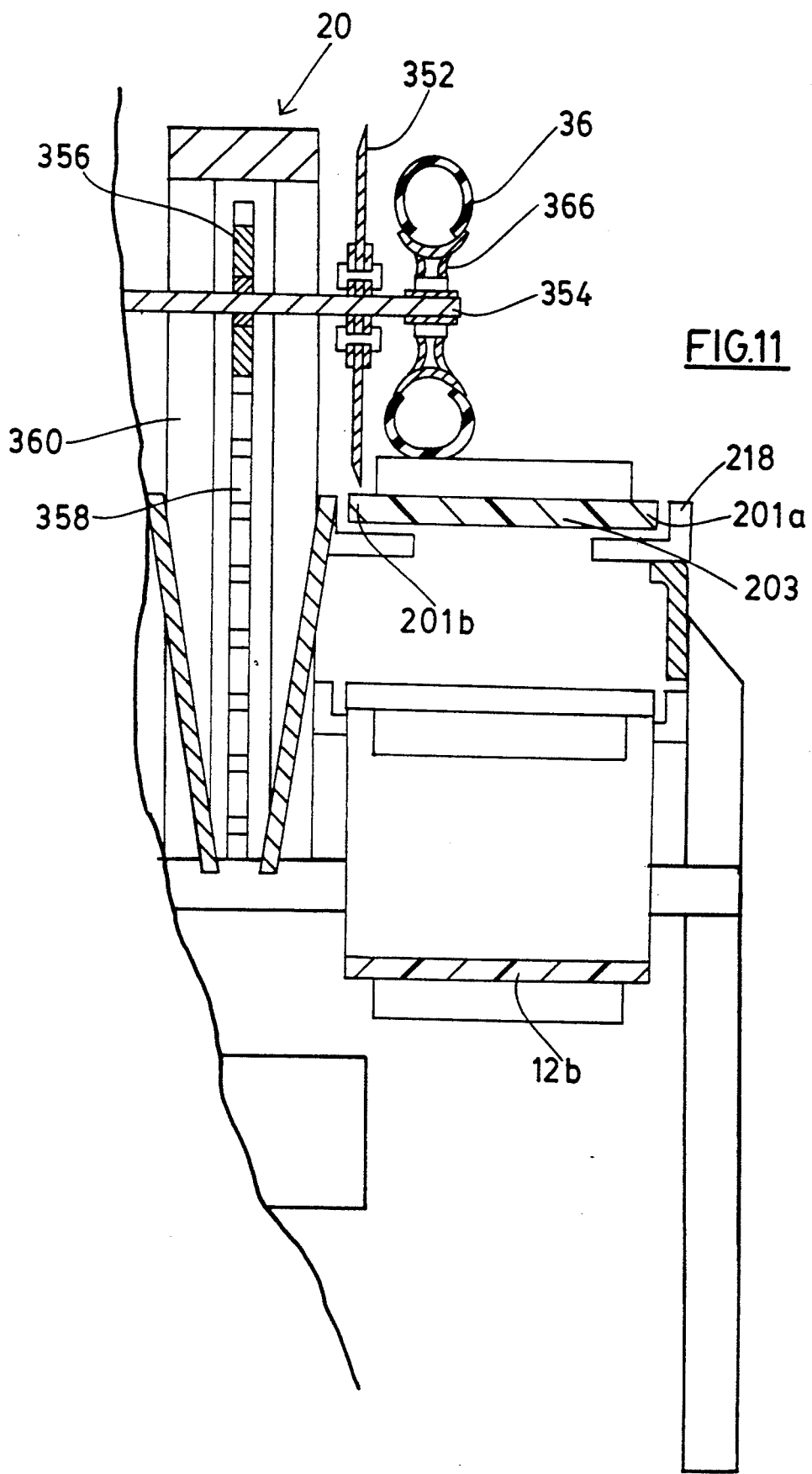
FIG. 11 is a section on the line XI—XI of FIG. 1.
Figure 12:
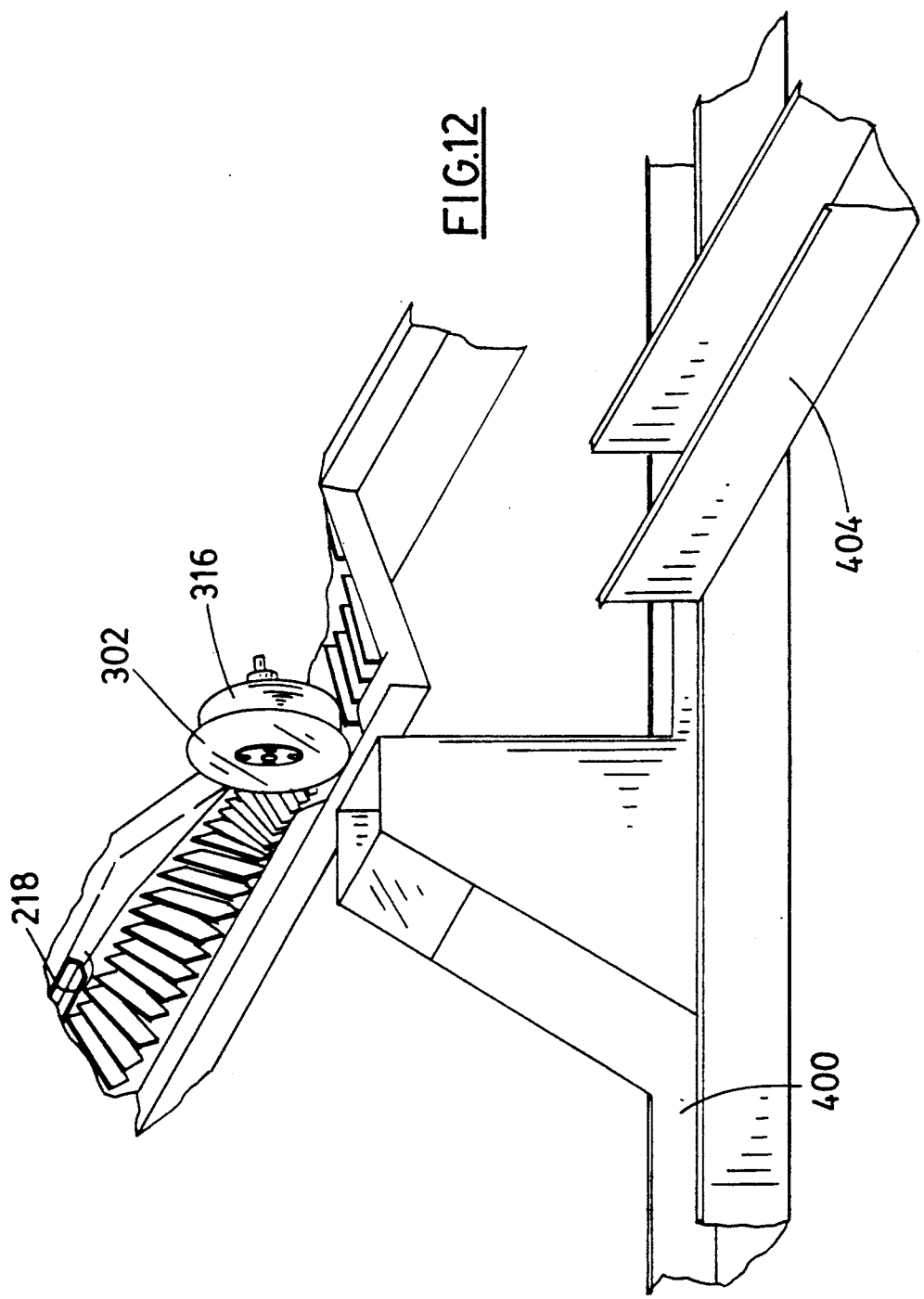
FIG. 12 is a view of a removal system for detritus cut from the carrots.

Carrots 24 may be prepared for delivery to the apparatus by washing in bulk washing apparatus such as, for example, a rotating drum washer. From the drum washer (not shown) carrots 24 are delivered by any convenient means, for example, a conventional conveyor belt to delivery station 10. Delivery station 10 (see FIG. 6) comprises an approach conveyor 114 which lifts carrots and discharges them from a top end onto a tray surface 102 which slopes downwardly from an upstream end to a downstream end. Carrots 24 are delivered to the upstream end of tray surface 102, the tilt of which is sufficient to encourage the carrots to slide down it towards the downstream end.

Tray surface 102 is provided with sidewalls 104 to prevent discharge of the carrots 24 from the sides thereof. At a median point between the upstream and the downstream ends, a dividing wall 106 is provided to divide the carrots into two flows. The dividing wall 106 conveniently is of V - configuration, with the point of the V directed towards the upstream end of the tray surface 102. Thus, carrots are not only divided into two separate flows, but the flare of the V-configuration of dividing wall 106 tends to separate the flows one from the other.

The location of V-shaped dividing wall 106 on the tray surface 102 is sufficiently downstream of the delivery end to allow for appreciable distribution of carrots on the tray surface 102 upstream of it. The length of tray surface 106 downstream of dividing wall 106 is a matter of choice, but should be sufficient that carrots do not pile up in this area. Thus, the general size and configuration of the tray surface 102, its sidewalls 104 and the dividing wall 106 is dependent on the speed of supply of carrots 24.

From the downstream end of tray surface 102, carrots are delivered to a tank 116 which may be filled with water for further washing of the carrots. Carrots pile up in two piles. Conveniently the tank may be partitioned and the one pile of carrots is built in each partition. Rising conveyors 108, having a lower upstream end 110 and an upper downstream end 112 takes carrots from respective piles and delivers them to respective main conveyor belts 12. The upper downstream end 112 of conveyor 108 is located above the upstream end of the main conveyor belt 12. Since there are two flows of carrots, there will, in fact, be two rising conveyors 108, one for each flow of carrots.

Generally, in this specification, operation of the apparatus will only be described with reference to one main conveyor belt 12. It will be appreciated that the operation of a second conveyor belt acting in tandem will be similar. If further conveyor belts are present, the operation will also be similar. Only where it is necessary to relate operation of an apparatus part to the other belt will the other belt 12 be referred to.

From the upper downstream end 112 of conveyor 108, carrots are dropped onto the upstream end of the main conveyor belt 12. The carrots are dropped from an appreciable height in order to give them sufficient impetus to settle into transverse compartments 202 so that each carrot lies longitudinally in a transverse compartment 202 across the width of the belt. The speed of the main belt 12 is such that for a flow of carrots 24 dropping from the downstream end 112 of conveyor 108, generally one carrot will locate itself in each transverse compartment 202. In fact, an operator work station 204 is usefully located near the main belt 12 in this region so that manual re-allocation or alignment or even rejection of the carrots is possible.

Figure 13:
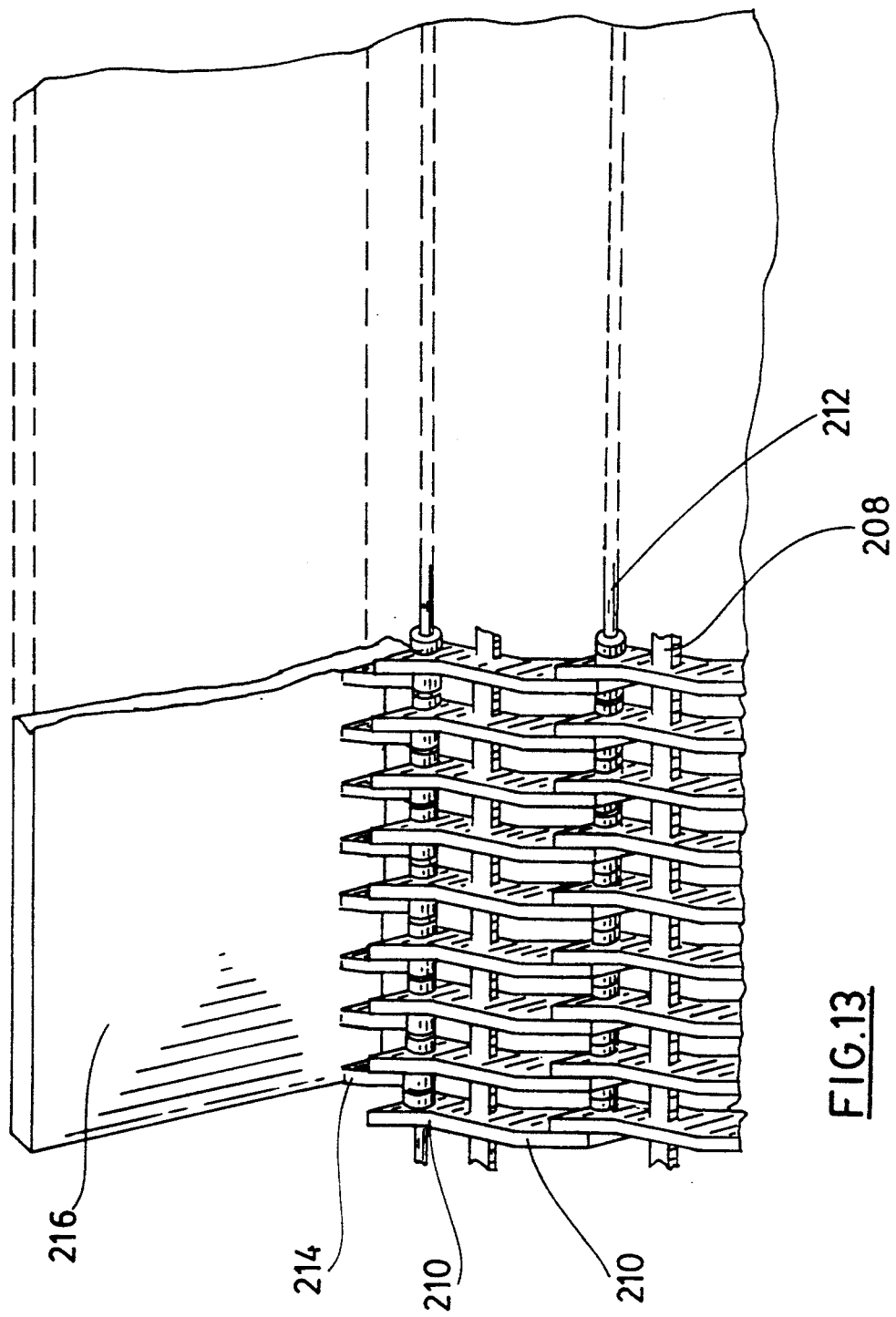
FIG. 13 is a detail view of part of the conveyor belts for the carrots, showing how the compartments are formed and showing engagement means for drive wheels.

The main conveyor belt 12 (See FIG. 13 for an enlarged detail.) is an endless belt made from sturdy, rigid or semi-rigid plastics material links. Each link 206 extends across the whole width of the belt, i.e. across margins 201 and mid-portion 203 to impart a degree of rigidity and strength in the transverse direction. Each such link 206 is formed by a central spine 208 extending the width of the belt and branches 210 extending to each side of the spine in the upstream and downstream direction of the belt. The branches 210 lying to one side of the spine are generally parallel one with the other and spaced apart sufficiently to allow interleaving of branches 210 of an adjacent link 206. Distal ends of branches 210 are provided with aligned bores and adjacent links are interconnected by a rod inserted through aligned bores of interleaved branches 210 of adjacent links.

The flexible belt made as described above with reference to FIG. 6 is flexible by hinging about each of the rods 212 which extend in a transverse direction of the belt. An allowable angle of hinging may be more than 180° and thus the belt is very flexible in this dimension. The belt 12, however, also has a degree of flexibility to allow it to twist. This flexibility is provided through flexibility of the rods 212 which may be made out of plastics material such as polyethylene. Flexibility to allow twisting is also provided by the length of branches 210 and the distance which they are spaced apart.

Transverse compartments 202 are provided on belt 12 by modified links 214 interspersed with links 206 at suitable intervals. The modified links 214 only differ from links 206 in that they are provided with an upstanding wall 216 extending the width of the mid-portion 203 of belt 12. The height of the upstanding wall 216 should be such as to confine carrots from undue movement in the direction of travel of the forward run of belt 12.

The margins 201 of the belt 12 are provided both as a flange which may be confined in a retaining lip when the belt tilts and to provide a channel in which a cutter knife may operate.

It will be seen that while the apparatus is described in connection with a carrot cutter, by suitable choice of dimensions for links 206, and suitable positioning of links 214, the apparatus may be made suitable for cutting of other vegetables. For example, if the apparatus were to be used for topping and tailing long green beans, a belt link 206 might alternate with a modified link 214 so that the upstanding walls were closer together.

The belt 12 is driven in a forward carrier run and a return run by drive means to be described hereinbelow. In an upstream region of the forward run, belt 12 is level and runs between side walls 218, which are spaced from its mid-portion 203 by its margins 201. The margins are of sufficient width to accommodate that portion of the carrot or other vegetable which is to be cut off; and thus its width is a matter of choice according to the vegetable concerned. For carrots the width of the margins may be suitably from 1" to 2". However, these dimensions are intended only as exemplary, and should not be taken as limiting.

At the upstream end of the forward run of the belt 12 the carrots lie transversely to the belt in compartments 202. Thus they are generally axially aligned with the axis of the compartments 202 and at right angles to the elongate axis of the forward run of the belt. In order to have a top or tail portion cut off, carrots must first be moved to one side of the belt so that the portion to be cut off overhangs margin 201a on that side. When the carrots are in this position they may be subjected to the action of a rotary knife in the first cutting station.

In order to ensure that all the carrots lie to one side of the belt, the belt 12 may be twisted so that its plane is tilted to allow the carrots to slide to that side.

The belt 12 is supported along the length of its forward run by a support surface 222. While for maximum support and accuracy of belt handling, it might be desirable to extend support surface 222 wholly across the width of the belt 12. In practice it is sufficient that support surface 220 is discontinued along a longitudinal central strip of lesser width than the mid-portion 203 of the belt 12. Thus, the support surface 220 may comprise a first surface 221 and a second surface 223. Surfaces 221 and 223 act together as a single surface and will be referred to only as support surface 220 except where details of their structure are under discussion.

Along level sections of belt 12 the support surface 220 is easy to provide. Surfaces 221 and 223 may each be provided by one horizontal leg 225 of bent metal section 225 of L configuration.

The vertical leg 227 of each metal section 225 is attached to the frame 229 of the apparatus, for example by welding.

When the belt has an overall width of say 2 feet, the distance between surfaces 221 and 223 may be roughly about 1 foot. Such distances are merely exemplary.

In the region of the belt where tilting is desired, the support surface 222 tilts to cause the belt to twist and to stabilize and support the belt in its twisted condition. The support surface 222 rises through a rising portion 224 which may conveniently extend over a distance of about 3 feet. The rising portion rises on one side opposed from margin 201a to a height sufficient to twist the belt 12 to have a degree of tilt such that the carrots slide down to overhang margin 201a. The range of angles of tilt may be for example 45 degrees. The rate of rise of the support surface to tilt it sideways should be sufficiently slight to accommodate the flexibility of the belt. Thus, if a very stiff belt is used, the rate of rise must be lesser than if a very flexible belt is used. Conveniently the angle of rise may be roughly about 30 degrees. When a degree of tilt of the support surface 222 and thus, also, of the plane of the belt 12 has been achieved such that the carrots slide in transverse compartments 202 to overhang gap 220a, no further rise is necessary.

When the maximum desired degree of tilt is achieved through the rising portion 224, there is a ramp portion 226 extending for example through a further distance of three feet. The tilt remains constant for a time, i.e.e raised edge 228 neither rises nor descends, to allow carrots time to slide downwardly. Over this ramp portion 226 the raised edge 228 may be confined by lip 223.

Once all the carrots lie at the bottom of the compartments 202, overhanging margin 201, they may be cut by a knife operating in the gap above the margin 201a between the ends of upstanding walls 106 and the edge of the belt 12. This step may be carried out while the belt and the support surface are still tilted, but, as illustrated, it may be convenient to return the belt to a level condition before operating the cutting mechanism. The tilted support surface may, therefore, be lowered through a falling portion 230 to lower the raised edge 228 so that it is again level with the other edge 227. The falling portion 230 may extend for a distance of 3 feet and thus the angle of fall of raised edge 228 may be about 30 degrees.

As illustrated, tilt ramp portion 226 slopes downwardly from raised edge 228, which is adjacent raised edge 228 of the other conveyor belt 12 operating in tandem with the conveyor belt 12 which is being described. The first cutting station comprises a rotary knife 302 located with its plane adjacent side edge 220 of belt 12. The rotary knife 302 has a lowermost point just above the general plane of belt 12 so as not to damage it. The stability of the belt 12 supported by support surface 220 may allow for accurate adjustment of the knife 302 to allow for proper cutting of carrots 24 without damage to belt 12.

Figure 3:
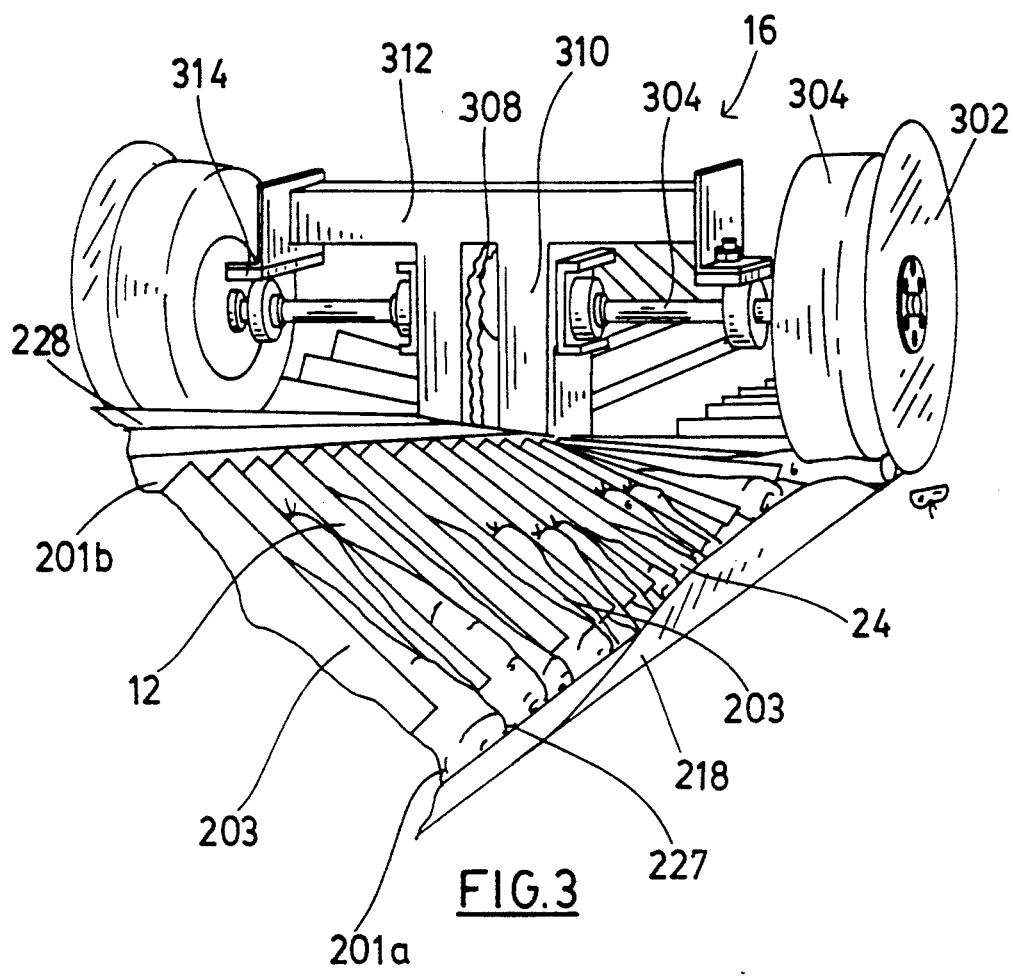
FIG. 3 is a view of the first cutting station of the carrot cutter of FIGS. 1 and 2.

Rotary knife 302 is driven through axle 304 through drive wheel 306 and drive chain 308. In fact, in the embodiment illustrated in FIG. 3, a single axle 304 is provided for the knives 302 operating in margins 201a of both belts 12. This axle 304 extends above the belts 12 and is supported by upstanding support members 310 to either side of drive wheel 306. Axle 304 is also supported by brackets 312 extending above it, and communicating to it through springs 314.

Also provided on axle 304 are wheels 316 having resiliently deformable soft tires 318. The purpose of the wheels 316 is to ride over the vegetables which are being cut, to inhibit any tendency to be pushed out of the way of the respective knife 302.

Side walls 218 are connected to support surface 220 by bolts 219 and are of flexible metal construction to twist when belt 12 twists on first or second ramps 14 or 18. Thus side wall 218 remains substantially at right angles to the plane of belt 12 irrespective of the orientation of belt 12. Side walls 218 may, when the belt 12 is twisted on ramp 14 or 18, act as a stop to prevent carrots from sliding right off belt 12. Side wall 218 is discontinuous in the region of cutting station 16 to each side of rotary knife 302 (see FIG. 1B). In the region of the knife 302, the plane of the knife 302 itself acts as a stop to prevent the bodies of the carrots from falling off belt 12 but, since side wall 218 is not present at this point, there is no barrier to detritus falling freely from the belt when cut from the carrots by knife 302.

Detritus cut from the ends of the carrots overhanging margin 201a is able to fall freely. It is convenient to provide a conveyor chute 400 under the knives 302 to catch the detritus and carry it away for use for other purposes, for example, for animal feed. Conveniently the chute 400 contains a conveyor belt which runs at right angles to the direction of the travel of the forward run of belts 12 and parallel to the axle 304 of the knives 302.

When the carrots travelling on the forward run of the conveyor belt 12 have passed rotary knife 302, they must be transferred to the other side of the belt to overhang the margin 201b in order to have their other ends cut off. Transfer of the carrots from one side of the belt to the other is achieved by means of a second ramp 18 region a second tilt ramp portion 326, tilting in the opposite direction to the tilt ramp portion 226, but otherwise similar to it. The support surface 222 tilts in the opposite direction from that in ramp region 14, gradually rising to its region of maximum tilt through a rising portion 324 from a point where it was generally level to the point where it achieves its maximum tilt. The support surface then maintains its angle of tilt along the distance of a raised edge 328 and then returns to a level condition through a falling portion 330. As the conveyor belt 12 follows this support surface, it is twisted in the opposite direction to its earlier twist in ramp region 14. Carrots slide down the tilt to overhang margin 201b.

The portions of the carrots overhanging margin 201b are cut off by a second rotary knife 352 of second cutting station 20.

Knife 352 is supported on axle 354, and is driven by drive wheel 356, which itself is driven through drive chain 358. Generally, the operation of the second cutting station 20 is similar to the operation of the first cutting station 16. However, when two conveyor belts 12 operating in tandem are provided, it is not necessary to extend the axle 354 across the width of the conveyor belts 12. Thus, although axle 354 is supported by upright support members 360, it is not necessary to also provide bracket arms to support the distal end of the axles. A wheel 366, having a soft, resilient tire 368, is provided adjacent knife 352 to hold the carrots down while being cut. In the case of knife 302, its corresponding wheel 316 is inboard of it. However, in the case of knife 352, its corresponding wheel is outboard of it.

Again side wall 218 bordering margin 201b is discontinuous in the region of knife 352 allowing detritus by knife 352 to fall freely. A chute 404 may be provided to carry this detritus away and a guide screen may deflect detritus from the return run 12b of belt 12. Chute 404 may conveniently adjoin chute 400 to amalgamate the collected detritus.

Once the carrots have passed cutting station 20 they may be discharged from conveyor belt 12 onto a discharge tray 406 of discharge region 20. Discharge tray 406 is shown only very generally, since any convenient collection means for discharged carrots may be used. Discharge tray 406 may include a conveyor to convey carrots to a collection area.

As the carrots are discharged from belt 12, the belt 12 may turn to start its return run. Conveniently, the belt 12 is turned from its forward run to its return run in an imposed direction about drive means for the belt. The drive means may comprise any convenient, conventional drive means for the conveyor belt. When, however, conveyor belt 12 is formed as previously described, from interlocked links such as belt sold under the Trade Mark Intralox by Intralox Inc., it is convenient to provide drive means which mesh with the links of the belt themselves in order to drive it on its forward and return runs. Thus, drive wheels 408 may be provided with ratchets 410 to mesh into gaps between links 206 of belt 12. The drive wheels may be made out of any suitable material, but since the conveyor belt 12 is formed from plastic material, it is convenient that the drive wheels also be made of hard-wearing plastics, possible with reinforced ratchet tips. In any event, the choice of material for the drive wheel should be such that undue wear of the conveyor belt is not induced. For a somewhat similar reason, it may be convenient to provide a plurality of drive wheels on a single axle 412, spaced to operate on the belt 12 at different points across its width. When two belts operating in tandem are used, then the bank of drive wheels 408 may extend across both belts.

On the return run of the belt, a degree of slack in the belt may be convenient to avoid undue strain. Support rollers such as support roller 414 may be provided to support the belt on its return run. It may be desirable to drive these support rollers to provide additional driving means for the belt. The support rollers 414 should be of a diameter such that they are locatable in the transverse compartments 202, the walls 216 of which may lie to each side of the support roller 414. As support roller 412 turns, it will act against the walls 216 to tend to urge the conveyor belt 12 on its return run.

It is to be noted that as the return run of conveyor belt 12 passes over chute 400, it will not impede the detritus falling into chute 400, since the return run is exactly underneath the forward run; and detritus is falling into the chute 400 from one side of the conveyor belt. Similarly, the detritus falling into chute 406 from the second cutting station will not foul the return run 12b of either belt, it is guided between the belts.

As the return run of conveyor belt 12 approaches the upstream end of the forward run, a further roller may act to transform the return run into the forward run.

Figure 4:
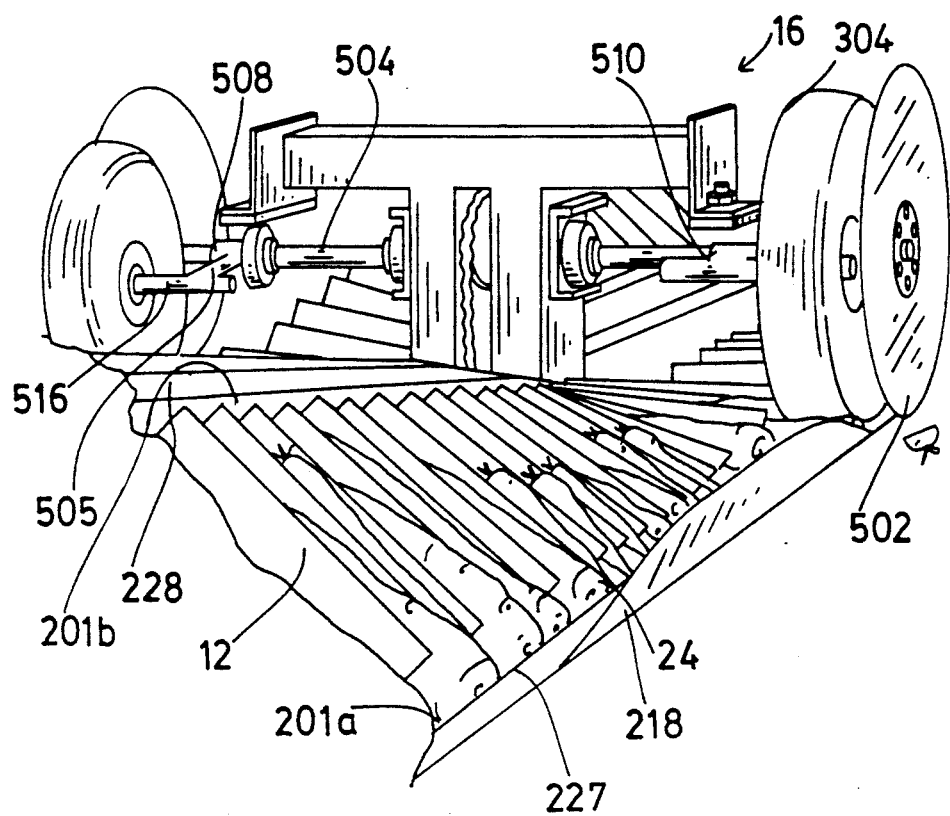
FIG. 4 is a view of another embodiment of a cutting station somewhat similar to that of FIG. 3.
Figure 5:
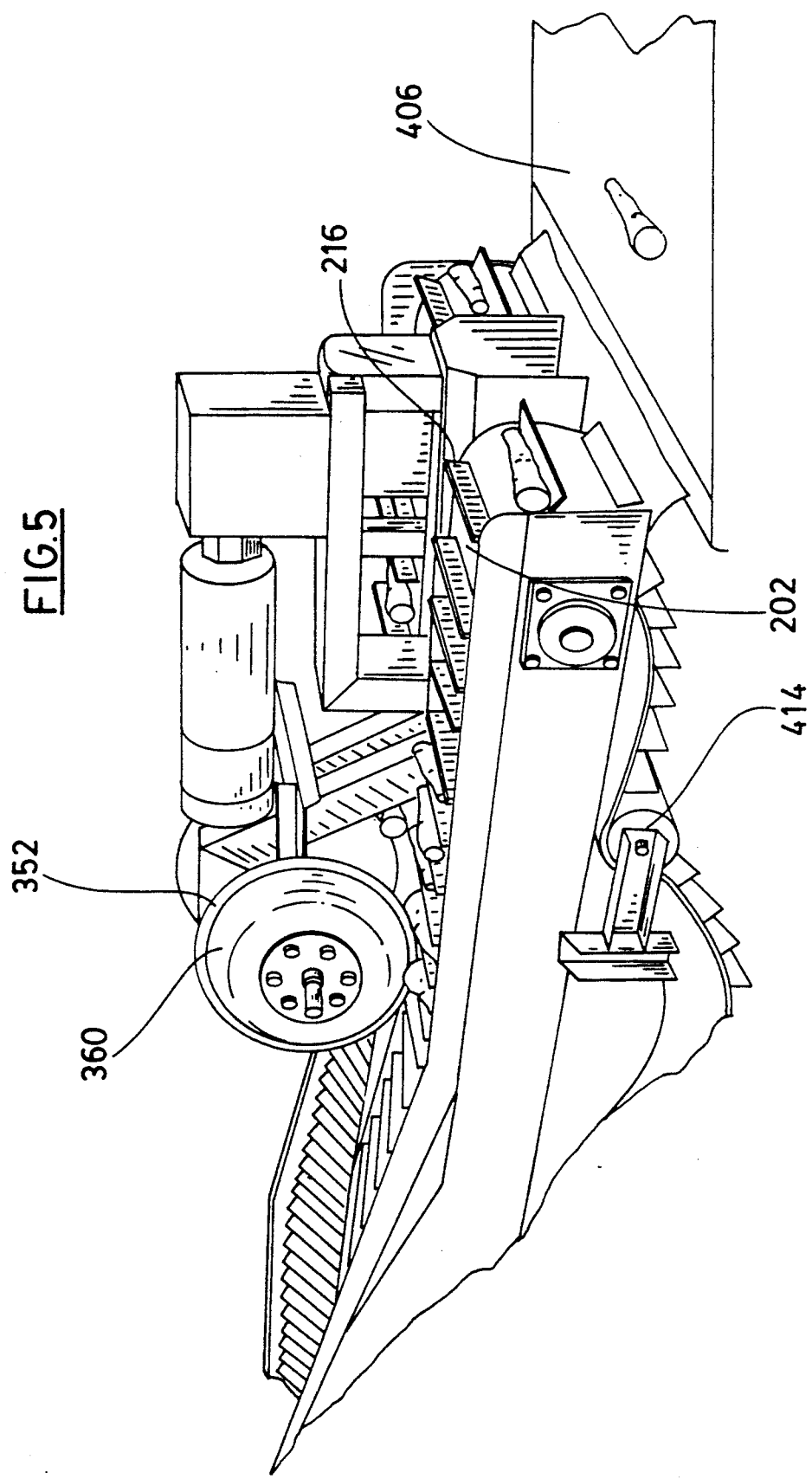
FIG. 5 is a view of the second cutting station of the carrot cutter of FIGS. 1 and 2.

In an alternative embodiment the wheels 316 and 366 are not carried on the same axle as the corresponding knives 302, 352. Some vegetables have a large variation in size and, even if tires 318, 368 are extremely soft and deformable, there may be occasions where a vegetable is so large that it will be crushed by wheel 316, 366 rather than merely being held in place. Thus it may be convenient to provide wheels 316, 366 on separate axles from knives 302, 352 and from each other. FIG. 4 shows such an embodiment. In the embodiment of FIG. 4, wheel 16 having tire 518 is carried on a dog-leg axle 505 to act on carrots on conveyor belt 12 slightly in front of rotary knife 502 acting in margin 201a between conveyor belt 12 and sidewall 218. The dog-leg axle 505 is rotatable on axle 504 through a joint 508. Its first leg 510 projects forwardly so that wheel 516 does not foul axle 504. As carrots approach the cutting station, wheel 516 rides up over the carrots by rotation of joint 508 on axle 504. As the carrots approach the knife, they may be leaving the influence of wheel 516, but are trapped between the cutting edge of the knife 502 and the wheel 316.

It is also possible to operate behind the rotary knife rather than in front of it. When two conveyors are operated in tandem, each wheel 516 is independently rotatable on axle 504, which may give some advantage in independent operation of the wheels 516 on the carrots. Another method of operating wheel 516 independently of knife 502 is to provide concentric axles for the knife and for the wheel. The axle for the wheel may be, in this case, a floating axle.

Figure 14:
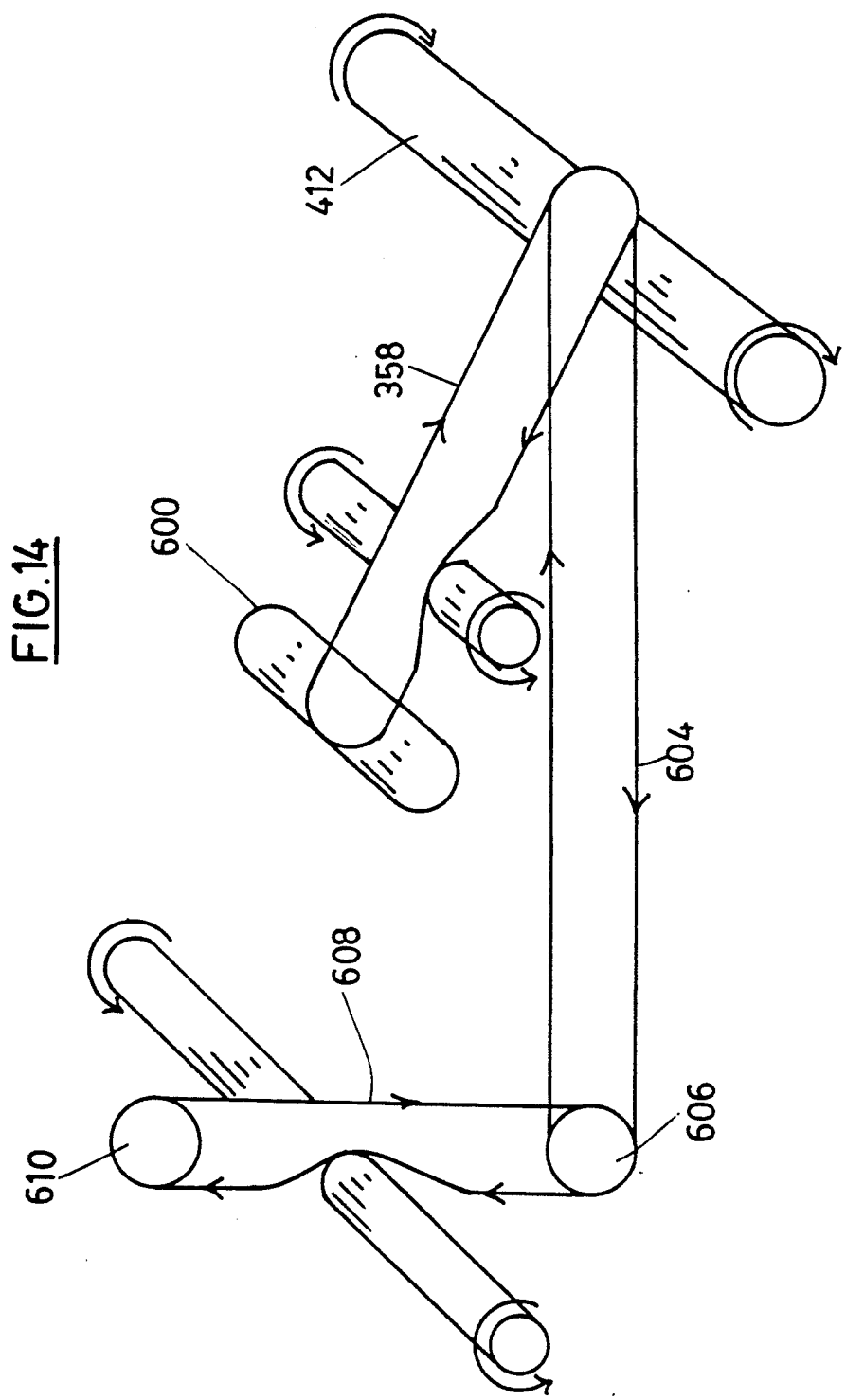
FIG. 14 is a schematic view of the unitary drive.

FIG. 14 shows schematically a drive mechanism for apparatus such as that described. A drive shaft 600 may be driven by any suitable motor means. The drive belt on chain 358 lying in a vertical plane between conveyor belts 12 may directly drive the axle 412 for drive wheels 408.

Drive belt 358 also drives on its reverse side, axle 354 carrying knives 352. Thus axle 354 rotates in a direction opposite to that of axle 412. Another drive belt 604 extending longitudinally under the conveyor belts 12 extends the drive from drive shaft 600 through shaft 412 to axle 304 for knives 302. Drive belt 600 extends between shaft 412 and a shaft 606 parallel to it and under axle 304. The belt of chain 308 which is vertically arranged between axle 610 drives, through its reverse surface, axle 304 to rotate in the same direction as axle 354 but in the opposite direction from axle 412.

The described arrangements of drive belts from a single drive shaft 600 may be geared through any suitable gearing. Moreover the illustrated arrangement is exemplary and many other ways of driving all axles 412, 352, and 302 from a single drive shaft 600 within the scope of the invention.

What is claimed is:

1. Apparatus for continuous operation to trim the ends of elongate vegetables, comprising:
   an endless conveyor belt formed by a plurality of interconnected transverse links, each link having a mid-portion and two margin portions to each side of the mid-portion, adjacent links being hingeably interconnected through a transverse hinge pin, the conveyor belt being arranged in a carrier run and a return run, the endless conveyor belt being divided into a plurality of transverse compartments by upstanding transverse walls provided at equal spaced apart intervals, each upstanding transverse wall formed integrally with a respective link and extending fully across the mid-portion of said respective link;
   a support surface for said carrier run of the conveyor belt, the support surface extending between first and second side edges thereof and including a first tilt ramp rising gradually from a first point where the first and second side edges are level to raise said first side edge with respect to said second side edge and descending gradually to lower said first side edge with respect to said second side edge to become level with it once more, whereby a first portion of the carrier run of the conveyor belt is tilted sideways in one direction, and the second tilt ramp rising gradually from a second point where the first and second side edges are level to raise said second side edge with respect to said first side edge and descending gradually to lower said second side edge to become level with it once more, whereby a second portion of the carrier run of the conveyor belt is tilted sideways in an opposed direction to said one direction;
   first and second stop means upstanding from and spaced from a lower respective side edge in the region of the first and second tilt ramps defining first and second gaps between the respective ramp and stop means;
   first and second knives located to rotate in said first and second gaps; and
   means to advance the conveyor belt on its carrier run and return it on its return run.

2. Apparatus as claimed in claim 1 in which the interconnected transverse links of the conveyor belt extend across the full width of the belt and the transverse hinge pin correspondingly extends across the full width of the belt.

3. Apparatus as claimed in claim 1 in which a further endless conveyor belt is provided and said endless conveyor belt and said further endless conveyor belt are operated in tandem in side-by-side relationship.

4. Apparatus as claimed in claim 3 in which feed means to provide a flow of vegetables is provided, the feed means having means to divide the resulting flow of vegetables into separated flows, and means is provided to direct the separated flows of vegetables to each of said endless conveyor belt and said further endless conveyor belt.

5. Apparatus as claimed in claim 1 in which the support surface includes level portions to support level portions of the carrier run of the conveyor belt.

6. Apparatus as claimed in claim 5 in which the support surface is discontinuous over a longitudinal strip contiguous with an elongate strip of the carrier run.

7. Apparatus as claimed in claim 1 in which the angle of tilt of the first and second tilt ramps is about 45 degrees.

8. Apparatus as claimed in claim 1 in which the angle of rise of the first and second tilt ramps is about 30 degrees.

9. Apparatus as claimed in claim 1 in which the first and second stop means comprise side walls connected to the margins of the endless conveyor belt along its forward run thereof along respective edges thereof.

10. Apparatus as claimed in claim 9 in which the side walls are discontinuous in the region of the first and second knives.

11. Apparatus as claimed in claim 1 in which the first and second knives are rotary knives.

12. Apparatus as claimed in claim 11 in which the planes of the knives are vertical.

13. Apparatus as claimed in claim 3 in which first knives for said endless conveyor belt and said further endless conveyor belt are located on opposite ends of a single axle extending above the carrier runs of said endless conveyor belt and said further endless conveyor belt.

14. Apparatus as claimed in claim 13 in which said axle additionally carries hold-down means for the vegetables.

15. Apparatus as claimed in claim 14 in which the hold-down means comprises a wheel located inboard of each first knife, the wheel having a soft, deformable tire.

16. Apparatus as claimed in claim 14 in which the hold down means comprises a wheel located outboard of each second knife, the wheel having a soft deformable tire.

17. Apparatus as claimed in claim 14 in which the hold down means is carried on said axle through a rotatable link whereby it is raisable and lowerable with respect to said axle.

18. Apparatus as claimed in claim 1 in which the means to advance the conveyor on its carrier and the first and second knives are driven through a single drive shaft.

* * * * *